US011260820B1

(12) United States Patent
Patel et al.

(10) Patent No.: US 11,260,820 B1
(45) Date of Patent: Mar. 1, 2022

(54) SIDE AIRBAG WITH ADAPTIVE POSITIONING FOR RECLINING SEAT

(71) Applicant: Ford Global Technologies, LLC, Dearborn, MI (US)

(72) Inventors: Deepak Patel, Canton, MI (US); Zhibing Deng, Northville, MI (US); Joseph Edward Abramczyk, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/107,822

(22) Filed: Nov. 30, 2020

(51) Int. Cl.
*B60R 21/207* (2006.01)
*B60N 2/22* (2006.01)
*B60N 2/68* (2006.01)
*B60R 21/16* (2006.01)

(52) U.S. Cl.
CPC .............. *B60R 21/207* (2013.01); *B60N 2/22* (2013.01); *B60N 2/68* (2013.01); *B60R 2021/161* (2013.01)

(58) Field of Classification Search
None
See application file for complete search history.

(56) References Cited

U.S. PATENT DOCUMENTS

| 7,673,937 | B2 * | 3/2010 | Core Almarza .... B60R 21/2338 297/216.1 |
| 9,102,300 | B2 * | 8/2015 | Faruque ................ B60R 21/207 |
| 9,296,353 | B1 * | 3/2016 | Choi ................. B60R 21/01554 |
| 10,479,310 | B2 * | 11/2019 | Dry ...................... B60R 21/207 |
| 11,059,442 | B2 * | 7/2021 | Adler ................. B60R 21/2334 |
| 2006/0022439 | A1 | 2/2006 | Bayley et al. |
| 2021/0009068 | A1 * | 1/2021 | Farooq ................. B60R 21/264 |

FOREIGN PATENT DOCUMENTS

| DE | 19738728 A1 * | 3/1999 | ........ B60R 22/1952 |
| JP | 2014-43128 A | 3/2014 | |
| JP | 2018-1870 A | 1/2018 | |
| JP | 2018-127057 A | 8/2018 | |
| KR | 20210027599 A * | 3/2021 | |
| WO | WO-2020080374 A1 * | 4/2020 | ............ B60R 21/01 |

* cited by examiner

*Primary Examiner* — Faye M Fleming
(74) *Attorney, Agent, or Firm* — Frank A. MacKenzie; Bejin Bieneman PLC

(57) ABSTRACT

The present disclosure relates to an assembly that has a seat, which can move between an upright position and a reclined position. The assembly also includes a track that is coupled to a side of the seat and a rail operably coupled to the rail. The assembly further includes an airbag inflator module that is mounted on the rail, such that the airbag inflator module slides along the rail when the seat moves between the upright position and the reclined position.

20 Claims, 8 Drawing Sheets

US 11,260,820 B1

SIDE AIRBAG WITH ADAPTIVE POSITIONING FOR RECLINING SEAT

BACKGROUND

Technical Field

The present disclosure relates to a side airbag for a vehicle seat.

Description of the Related Art

Vehicles are equipped with airbags. In certain vehicle impacts, airbags are inflated to protect vehicle occupants. There can be multiple airbags in a vehicle.

BRIEF SUMMARY

The present disclosure relates to different aspects of mounting a side airbag in a seat of a vehicle in such a way that the side airbag can slide relative to the seat per a reclining angle of the seat. Specifically, the present disclosure describes an assembly that includes a seat, which can move between an upright position and a reclined position, and a track that is coupled to a side of the seat. A rail is operably coupled to the track and an airbag inflator module that is mounted on the rail. The airbag inflator module slides along the rail when the seat moves between the upright position and the reclined position.

Another aspect of the present disclosure relates to a seat frame with a moveable airbag system mounted on a side of the seat frame. The moveable airbag system includes a track coupled to the seat frame and a rail coupled to the track. The moveable airbag system further includes an airbag inflator module mounted on the rail. The moveable airbag system includes a cable that couples at an end of the rail to a pulley. The moveable airbag system also includes a pull piston coupled to another end of the rail.

BRIEF DESCRIPTION OF THE SEVERAL VIEWS OF THE DRAWINGS

For a better understanding of the embodiments, reference will now be made by way of example to the accompanying drawings. In the drawings, identical reference numbers identify similar elements or acts. The sizes and relative positions of elements in the drawings are not necessarily drawn to scale. For example, some of these elements may be enlarged and positioned to improve drawing legibility.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures or methods associated with vehicles have not been shown or described in detail to avoid unnecessarily obscuring descriptions of the embodiments.

Figure 1:
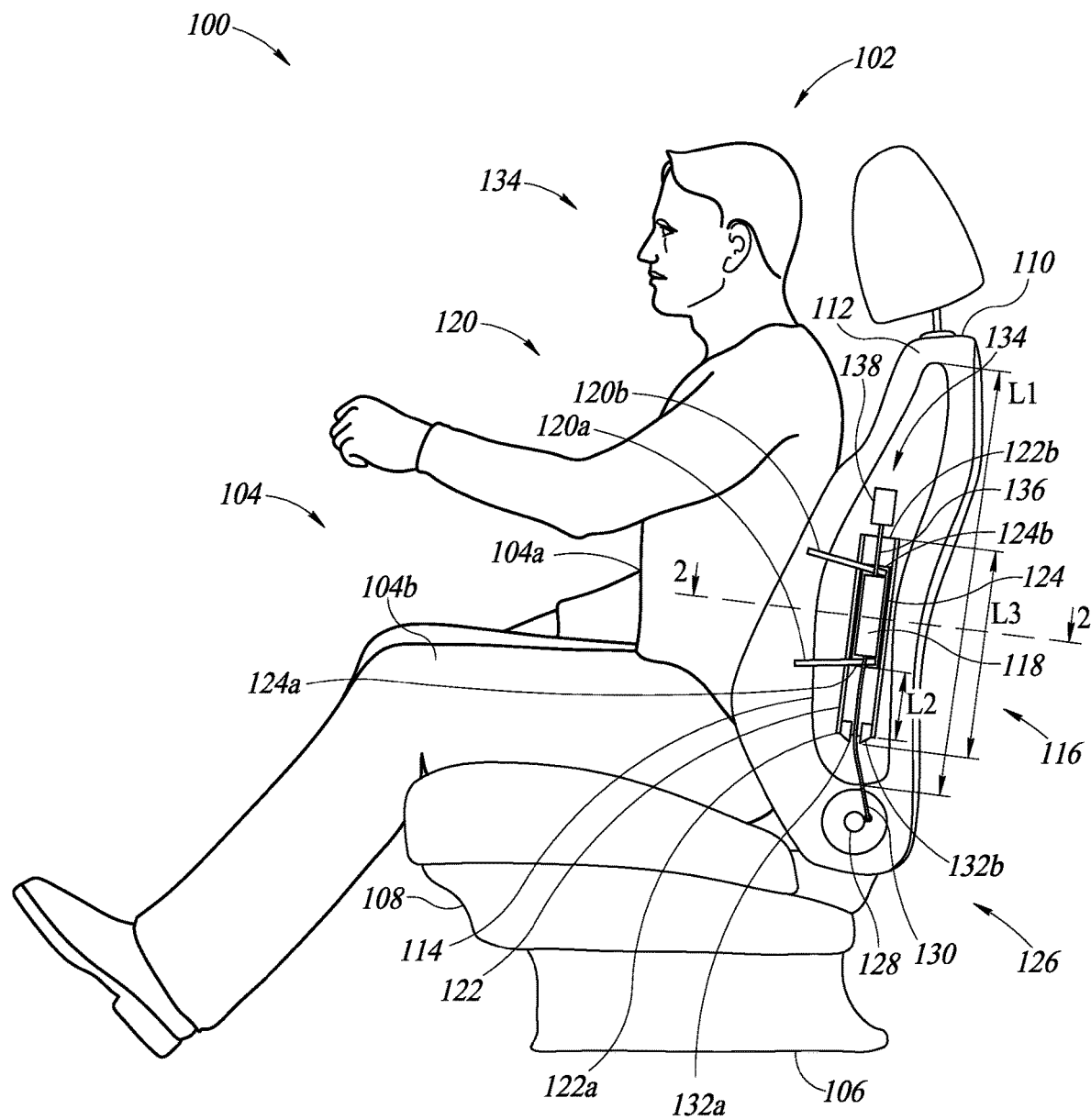
FIG. 1 is a side view of a seat in an upright position in accordance with an embodiment of the present disclosure.
Figure 3:
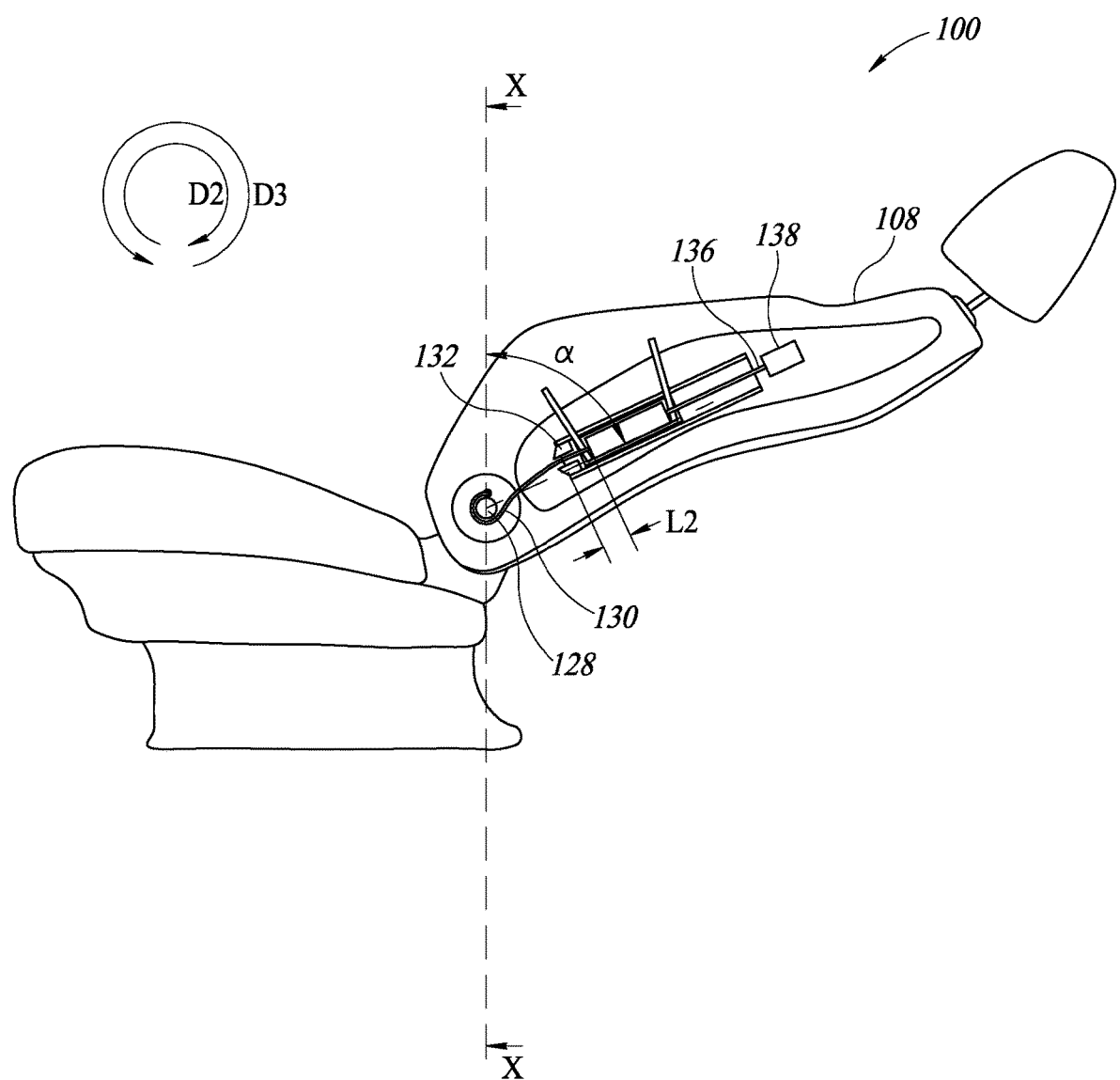
FIG. 3 is a side view of the seat of FIG. 1 in a reclined position.

FIGS. 1 and 3 illustrate different positions of a seat 102 including an airbag deployment assembly 100, in accordance with the present disclosure. Specifically, FIG. 1 is a side view of the seat 102 in an upright position while FIG. 3 is the seat 102 in a reclined position. The assembly 100 is integrated with a door side of the seat 102.

The seat 102 is positioned on and coupled to a mounting frame 106 that secures the seat 102 to a floor of the vehicle. The seat 102 also includes a seat base 108 mounted on the mounting frame 106. A frame or seatback 110 of the seat 102 is configured to support the back of the passenger 104 and is made of a skeleton and a foam material integrated with the skeleton. The back 110 is pivotably attached to the seat base 108 in such a way that the back 110 can recline with respect to the seat base 108. For instance, the seat 102 includes a pivoting unit (not shown) that enables the back 110 to assume a plurality of reclining positions such as the ones shown in FIGS. 3, 4, 5, and 6. In addition, the seat 102 includes an adjuster (not shown) that allows the passenger 104 to adjust a reclining angle α (shown in FIG. 3) of the back 110.

The back 110 also includes a side portion 112 that is between the seat 102 and an interior portion of a vehicle door. The side portion 112 includes a recess 114 that has a longitudinal length L1 along a length of the back 110. The recess 114 houses a variety of components related to the seat. The recess 114 is covered by upholstery or a plastic covering on the back 110.

The assembly 100 includes a moveable airbag system 116, which is configured to move to different positions based on a reclining position of the back 110. The moveable airbag system 116 moves a restraint or safety system, such as an airbag to slide along a length L3. As shown in FIG. 1, the moveable airbag system 116 is coupled to one side of the back 110, for instance, the side portion 112 of the back 110. Alternately, the moveable airbag system 116 is housed in the recess 114.

The moveable airbag system 116 includes an airbag inflator module 118 that is configured to inflate the airbag in the event of the side collision. The airbag inflator module 118 can be a hard-pack airbag that has a housing made of a rigid material, such as metal or plastic, or a soft-pack airbag in which the housing is made of fabric. Further, the housing of the airbag inflator module 118 houses various components of the airbag inflator module 118, such as the airbag (not shown) and an inflator (not shown).

The airbag inflator module 118 includes a pair of deployment guides or arms 120a, 120b mounted on either side of the airbag inflator module 118. A first deployment guide 120a is mounted proximate to a first end of the airbag inflator module 118 and a second deployment guide 120b is mounted proximate to a second end, opposite to the first end, of the airbag inflator module 118. The first deployment guide 120a and the second deployment guide 120b are configured to guide the inflated airbag.

The moveable airbag system 116 includes different components that are configured to slide the airbag inflator module 118 along the longitudinal length L3 of the recess 114 based on a reclining position of the back 110. For instance, the moveable airbag system 116 includes a track 122 that is positioned on the side portion 112 of the back 110 and housed inside the recess 114. In one example, the track 122 is attached to the back 110 using fasteners, such as nuts and bolts or rivets or welded joints. Alternatively, the track 122 can also be formed as an integrated part of the back 110 (as described with respect to FIGS. 7 and 8). The track 122 is firmly secured to the back 110 in such a way that the track 122 does not move during the deployment of the airbag inflator module 118.

The moveable airbag system 116 also includes a rail or housing 124 that is operably coupled to the track 122 in such a way that the rail 124 can slide relative of the track 122. The airbag inflator module is attached to or positioned within the rail or housing 124. A manner by which the rail 124 is coupled to the track 122 is explained with respect to FIG. 2. The pair of deployment guides 120 extend from the rail and move with the rail along the track.

The moveable airbag system 116 includes different components that are configured to slide the rail 124, and consequently the airbag inflator module 118 in response to the reclining of the back 110 with respect to the seat base 108. For instance, the moveable airbag system 116 includes a pulley system 126 that is configured to slide the airbag inflator module 118 towards a first end 122a of the track 122. The pulley system 126 includes a pulley 128 that is coupled to a pivoting end of the back 110 in such a way that the pulley 128 rotates when the back 110 reclines with respect to the seat base 108. The pulley system 126 also includes a cable 130 that couples the pulley 128 to a first end 124a of the rail 124. Alternatively, the cable 130 is attached to one end of the airbag inflator module 118.

In operation, the cable 130 is extendable and retractable in response to movement of the seat 102 between the upright position and the reclined position. In other words, the cable 130 extends and retracts when the back 110 reclines with respect to the seat base 108. Specifically, the cable 130 winds around the pulley 128 when the cable 130 retracts, while the cable 130 unwinds from the pulley 128 when the cable 130 extends. As the cable 130 retracts, the cable 130 pulls the rail 124 towards the first end 122a, such that a longitudinal gap L2 (shown in FIG. 3) between the first end 124a of the rail 124 and the first end 122a of the track 122 decreases. On the other hand, as the cable 130 extends, the rail 124 moves such that the longitudinal gap L2 increases. As may be understood, the pulley 128 causes a longitudinal gap L2 to decrease as the back 110 reclines.

To prevent tangling of the cable 130, the pulley system 126 includes a cable guide 132 that guides the cable 130 during the winding and unwinding of the cable 130. The cable guide 132 has an aperture that is sized and shaped to receive the cable 130. Alternatively, the cable guide 132 can be in the form of a pair of a first cable guide 132a and a second cable guide 132b through which the cable 130 can extend. The first cable guide 132a and the second cable guide 132b are positioned at the first end 122a of the track 122 that is closer to the pulley 128. Although the cable 130 and the pulley system 126 are illustrated for sliding the rail 124, any other belt-drive, rope-drive, or chain-drive can be implemented to slide the rail 124.

While the moveable airbag system 116 includes the pulley system 126 to slide the airbag inflator module 118 towards the first end 122a, the moveable airbag system 116 can include another system that slides the airbag inflator module 118 towards a second end 122b of the track 122. For instance, the moveable airbag system 116 includes a pull piston 134 that is configured to slide the airbag inflator module 118 towards the second end 122b. In other words, the pull piston 134 slides the airbag inflator module 118 in a direction opposite to a direction in which the pulley system 126 slides the airbag inflator module 118. As shown, the pull piston 134 is coupled proximate to the second end 122b of the track 122. The pull piston 134 includes a piston rod 136 and a cylinder 138, such that the piston rod 136 is coupled to a second end 124b of the rail 124. The piston rod 136 is connected to a piston head (not shown) that is housed inside the cylinder 138. During operation, the piston head slides inside the cylinder 138 towards the first end 122a, which causes the piston rod 136 to slide out of the cylinder 138 when the back 110 moves from the upright position to the reclined position. On the other hand, the piston head slides inside the cylinder 138 towards the second end 122b, which causes the piston rod 136 to slide into the cylinder 138 when the back 110 moves from the reclined position to the upright position.

The pull piston 134 is actuated when the back 110 is at the upright position. The pull piston 134 is enabled to slide the airbag inflator module 118 when the piston rod 136 has slid out from the cylinder 138. To actuate the pull piston 134, the pull piston 134 also includes an energizing element (not shown) housed in the cylinder 138 and coupled to the piston rod 136 and the piston head. Further, the energizing element is coupled to the piston head and the piston rod 136 in such a way that the energizing element gets energized when the piston rod 136 slides out of the cylinder 138. The energizing element can be a gas that may be compressed by the piston head as the piston rod 136 slides out of the cylinder 138. Alternatively, the energizing element can be a spring, either a tension spring or a compression spring that gets energized by the piston head when the piston rod 136 slides out of the cylinder 138. In either case, the energizing element enables the piston rod 136 to allow the change in the longitudinal gap L2 when the back 110 reclines. A detailed manner by which the pull piston 134 operates will be explained subsequently.

In the illustrated embodiment, the reclining angle α is formed between the back 110 and an axis X-X as shown in FIG. 3. The reclining angle α can vary between 0 degrees to 60 degrees. During operation, as the passenger 104 reclines the back 110, the reclining angle α increases. As the reclining angle α of the back 110 increases, the pulley 128 rotates causing the cable 130 to wind around the pulley 128 along a first direction D2. As a result, the cable 130 pulls the airbag inflator module 118 towards the first end 122a, and the longitudinal gap L2 decreases. Simultaneously, as the piston rod 136 slides out, the energizing element inside the cylinder 138 gets energized. The pulley 128 keeps on winding the cable 130 till the passenger 104 increases the reclining angle α of the back 110. Once the passenger 104 adjusts the reclining angle α, the pulley 128 stops winding the cable 130 and holds the airbag inflator module 118 in the position corresponding to the reclining angle α of the back 110. Moreover, the tension in the cable 130 caused by the pulley 128 prevents the cylinder 138 from pulling the piston rod 136

On the other hand, when the passenger 104 reduces the reclining angle α to bring the back 110 from a reclined position to the upright position as shown in FIG. 1, the pulley 128 starts to rotate in a second direction D3 thereby releasing the tension in the cable 130. The release of tension allows the energized element inside the cylinder 138 to pull the piston rod 136 inside. As the piston moves into the cylinder 138, the piston pulls the airbag inflator module 118 towards the second end 122b thereby increasing the longitudinal gap L2. The cylinder 138 pulls the piston rod 136 as long as the passenger 104 pivots the back 110. Once the passenger 104 has adjusted the reclining angle α again and the back 110 is now adjusted, the pulley 128 stops rotating and prevents further unwinding of the cable 130. As a result, the tension in the cable 130 develops, which prevents the piston rod 136 from moving further into the cylinder 138. Once the cable 130 is taught, the airbag inflator module 118 is secured at a defined position inside the recess 114 corresponding to the upright position.

Figure 2:
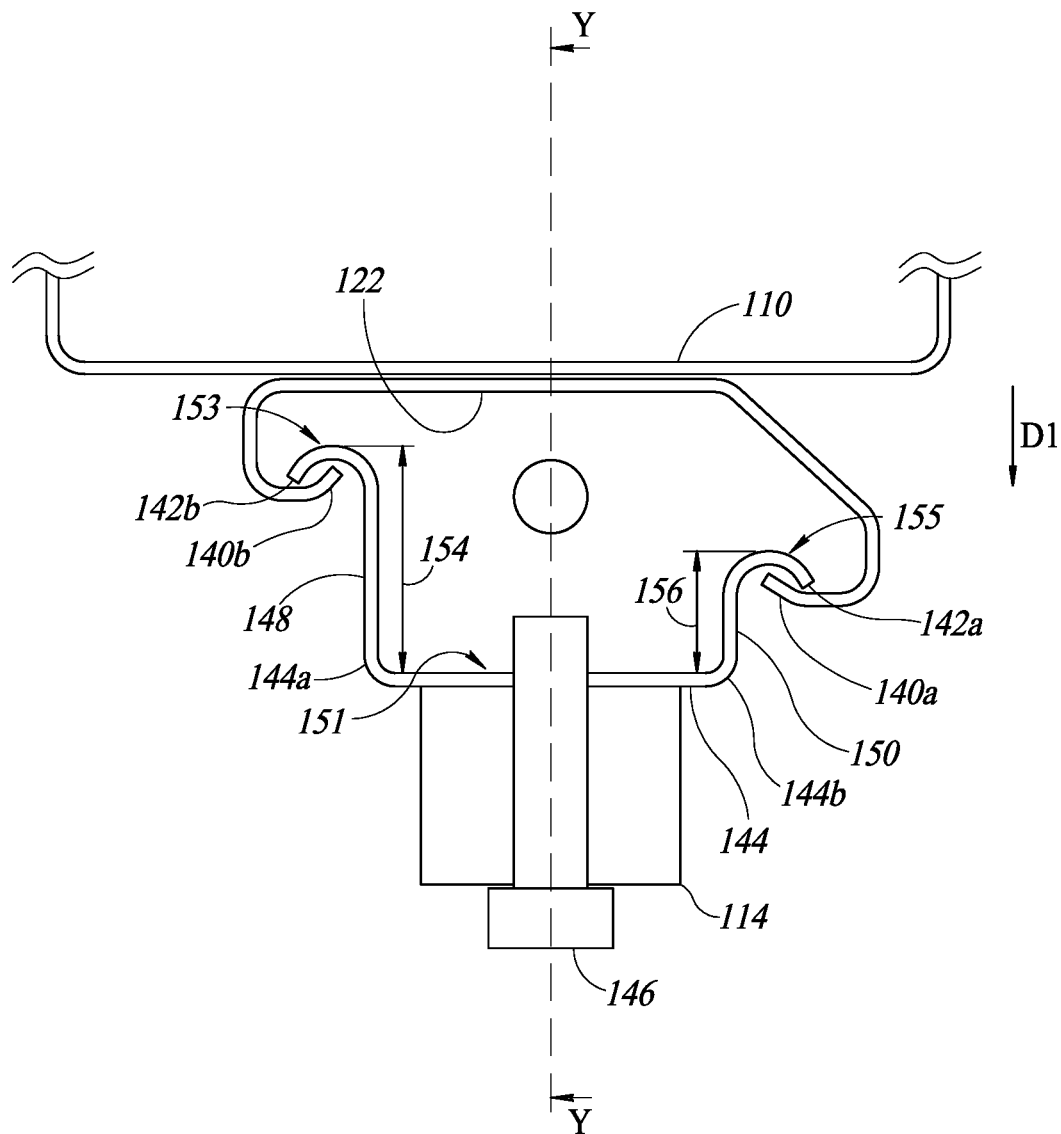
FIG. 2 is a partial cross-sectional view of the seat of FIG. 1, taken along line 2-2 in FIG. 1.

FIG. 2 is a cross-sectional view taken along the line 2-2 in FIG. 1. Only the features of the moveable airbag system 116 are shown for clarity of the drawings. The track 122 is attached to the back 110, such that there is no relative motion between the track 122 and the back 110. The track 122 includes a pair of curved edges 140a, 140b that extends along the length of the track 122 and curve inward towards a center of the track. Similarly, the rail 124 includes another pair of curved edges 142a, 142b that extend along the length of the rail 124 and curve outward away from a center of the rail. The curved edges 140a, 140b are profiled in such a way that the curved edges 140a, 140b curve inward towards a center line y-y of the moveable airbag system 116 thereby creating a longitudinal hook-shaped profile. On the other hand, the curved edges 142a, 142b are profiled in such a way that the curved edges 142a, 142b curve outward towards the centerline y-y thereby creating another longitudinal hook-shaped profile. Moreover, the curved edges 140a, 140b, and the curved edges 142a, 142b overlap each other in such a way that the rail 124 is allowed to slide along the length while the rail 124 is prevented from moving side to side along the rail 124. The curved edges 140a, 140b, 142a, 142b may be lubricated by a lubricant to reduce friction. Alternatively, the track 122 is operably coupled to the rail 124 using a rack-and-pinion gear train in which a rack is attached to the track 122 while a pinion is attached to the rail 124.

The rail 124 includes a centrally positioned platform 144 on which the airbag inflator module 118 is coupled using a fastener 146. Although the present illustration shows the fastener 146 to secure the airbag inflator module 118 with the rail 124, other fastening means can be used to secure the airbag inflator module 118 with the rail 124.

The rail 124 also includes a first wall 148 that extends between a first one of the curved edges 142a and a first side 144a of the platform 144, and a second wall 150 that extends between a second one of the curved edges 142b and a second side 144b of the platform 144. The first wall 148 has a first dimension 154 along a first direction D1 while the second wall 150 has a second dimension 156 along the first direction D1. In an example, the direction D1 can be along the y-axis. The first dimension 154 is greater than the second dimension 156. In the illustrated embodiment, the first dimension 154 and the second dimension 156 are determined based on various parameters, such as the dimensions and an interior profile of the recess 114. A depth of the recess 114 determines a height at which the platform 144 should be present which, in turn, determines the first dimension 154 and the second dimension 156. Alternatively, interior profiles and counters of the recess 114 determine the first dimension 154 and the second dimension 156, so that the rail 124 does not touch the edges of the recess 114.

The first dimension extends from a surface 151 to an end 153 of the curved edge 142b. The second dimension extends from the surface 151 to an end 155 of the curved edge 142a.

Figure 4:
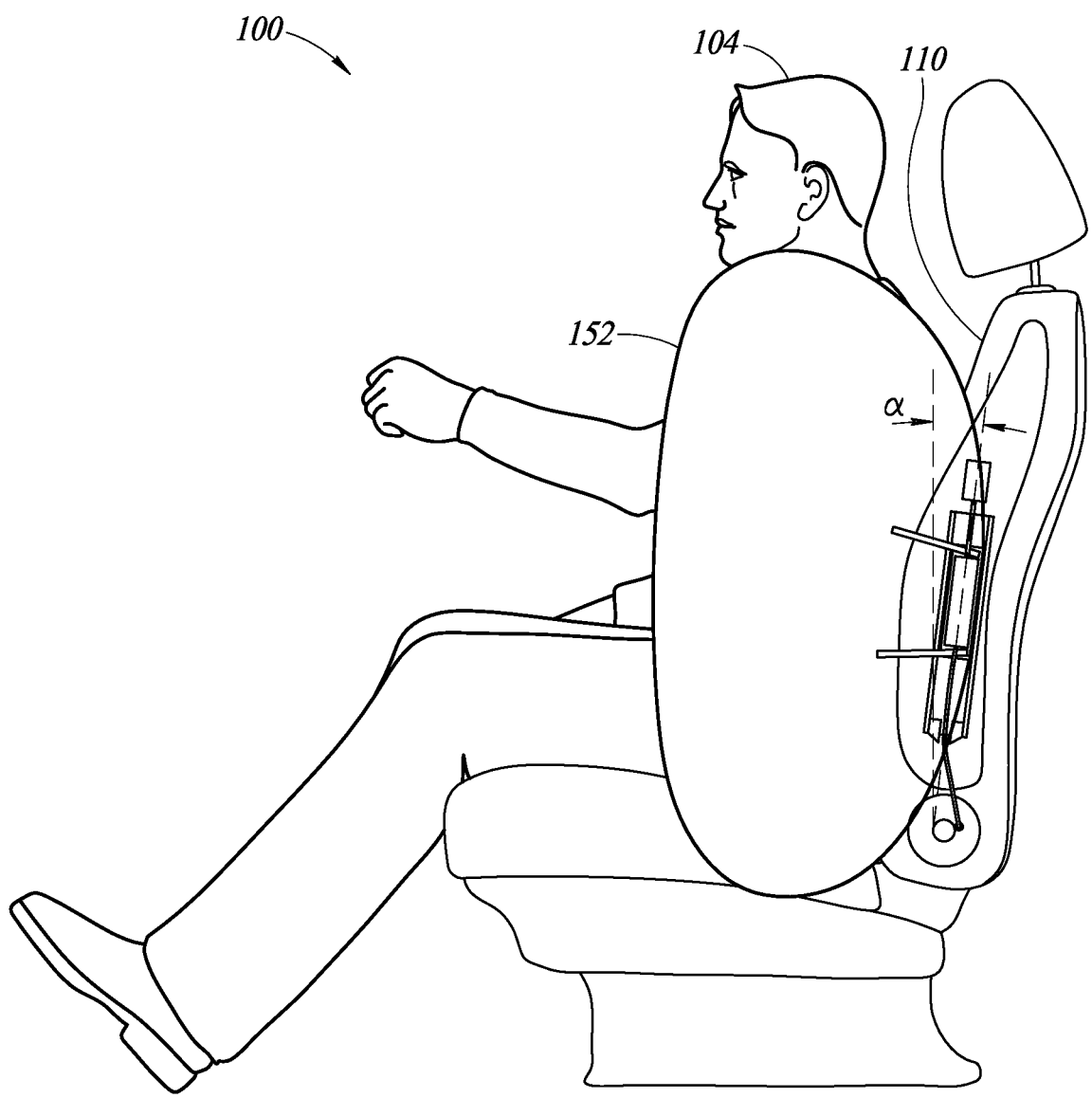
FIG. 4 is a side view of a seat in an upright position with a deployed airbag in accordance with an embodiment of the present disclosure.
Figure 5:
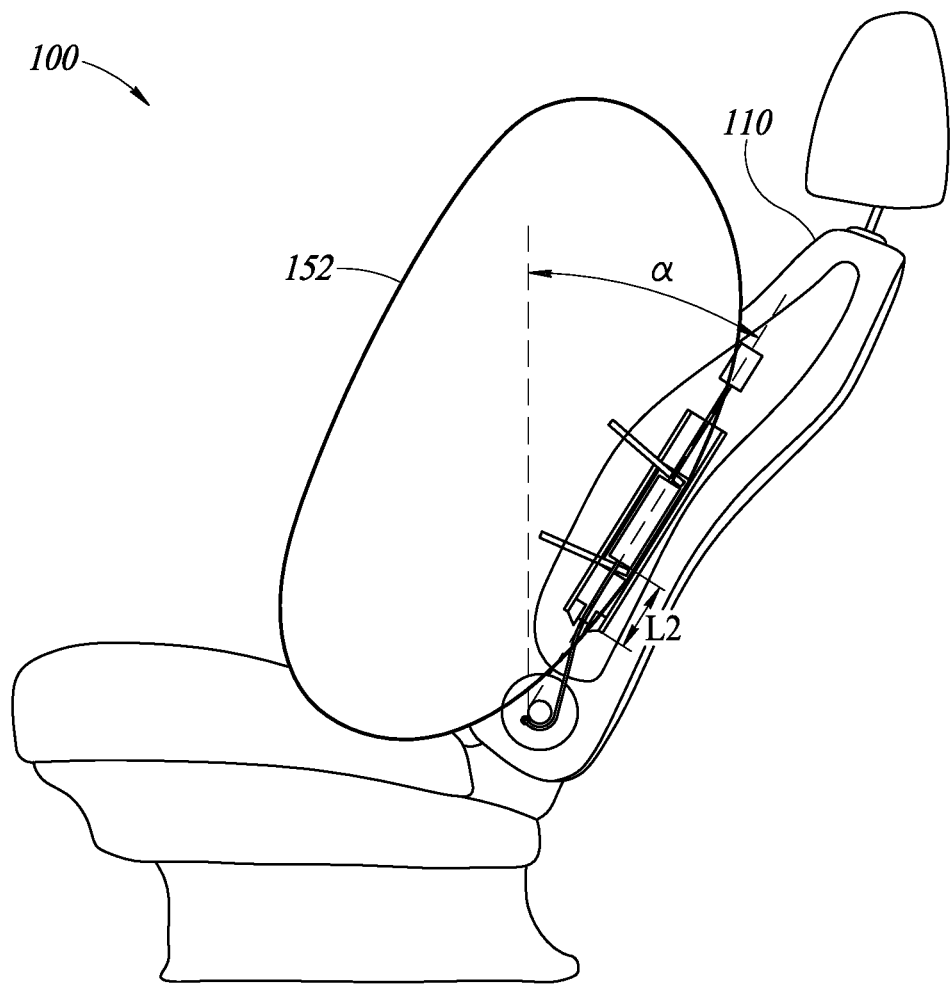
FIGS. 5 and 6 are side views of the seat of FIG. 4 in different reclined positions with the deployed airbag.
Figure 6:
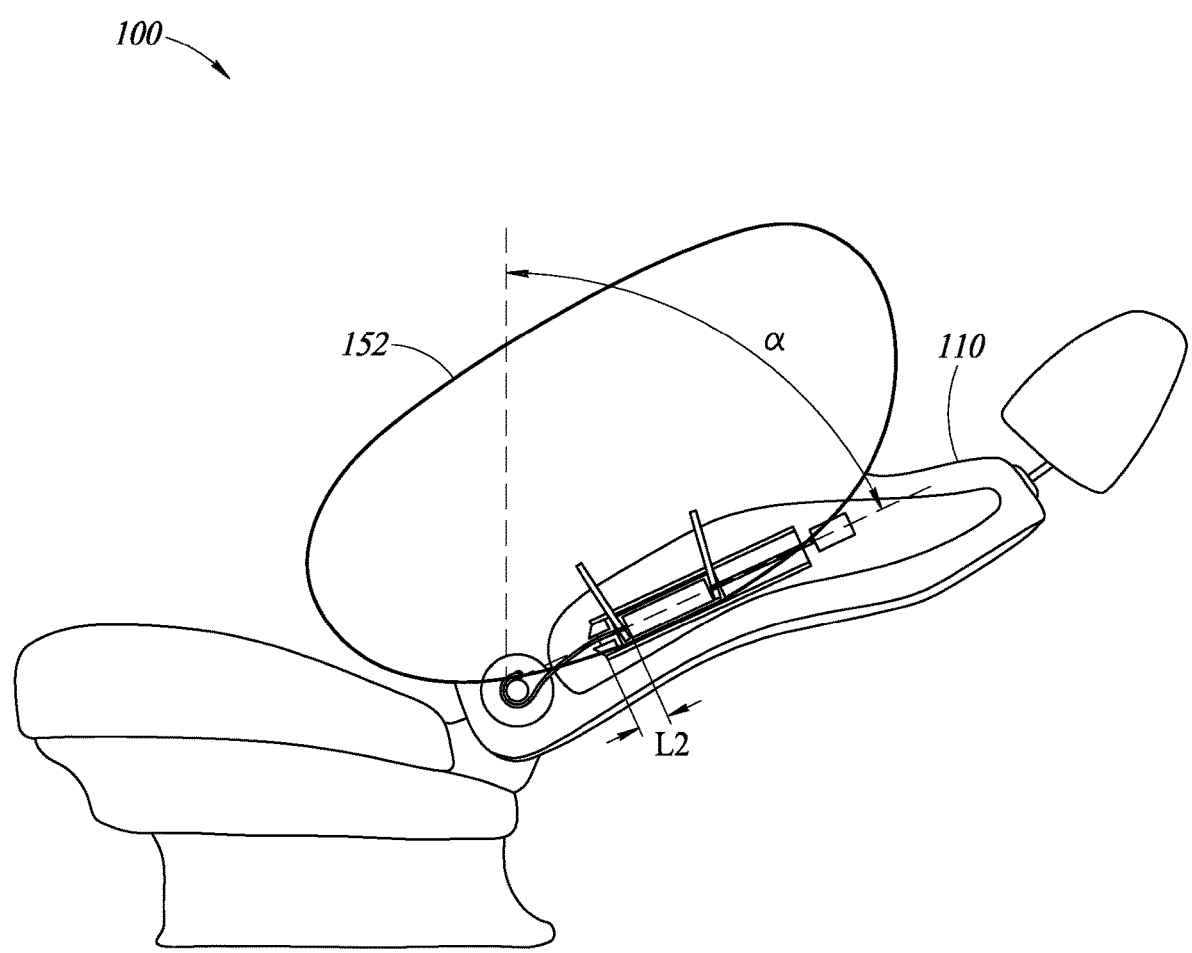

Different positions of a deployed airbag 152 of the assembly 100 with respect to the reclining positions of the back 110 are shown with respect to FIGS. 4, 5, and 6. Specifically, FIG. 4 is a side view of the seat 102 in an upright position with the deployed airbag 152. FIG. 5 is a side view of the seat 102 in a partially reclined position with the deployed airbag 152, and FIG. 6 is a side view of the seat 102 in a reclined position with the deployed airbag 152.

As shown in FIG. 4, the reclining angle α is 15-25 degrees and the back 110 is at an upright position. In such a position, the airbag 152 is nearest to the second end 122b of the track 122 and the longitudinal gap L2 is a first dimension. The lower portion of the airbag 152 extends along a part of the seat base 108.

In FIG. 5, the back 110 is reclined at the reclining angle α in a range of 25 to 35 degrees, such that the airbag 152 inflator has slid down towards the first end 122a of the track 122. The longitudinal length L2 is a second dimension that is less than the first dimension. In such a position, the lower portion of the airbag 152 overlaps a portion of the seat base 108, however, there is less overlap than in the configuration of FIG. 4. When the back 110 is reclined further to the further reclining angle, such that the reclining angle is 60 degrees or more, the airbag 152 is moved closer to the first end 122a such that the longitudinal gap L2 is a third dimension that is less than the second dimension, as shown in FIG. 6. At this position, the lower region of the airbag 152 does not overlap the seat bottom.

Figure 7:
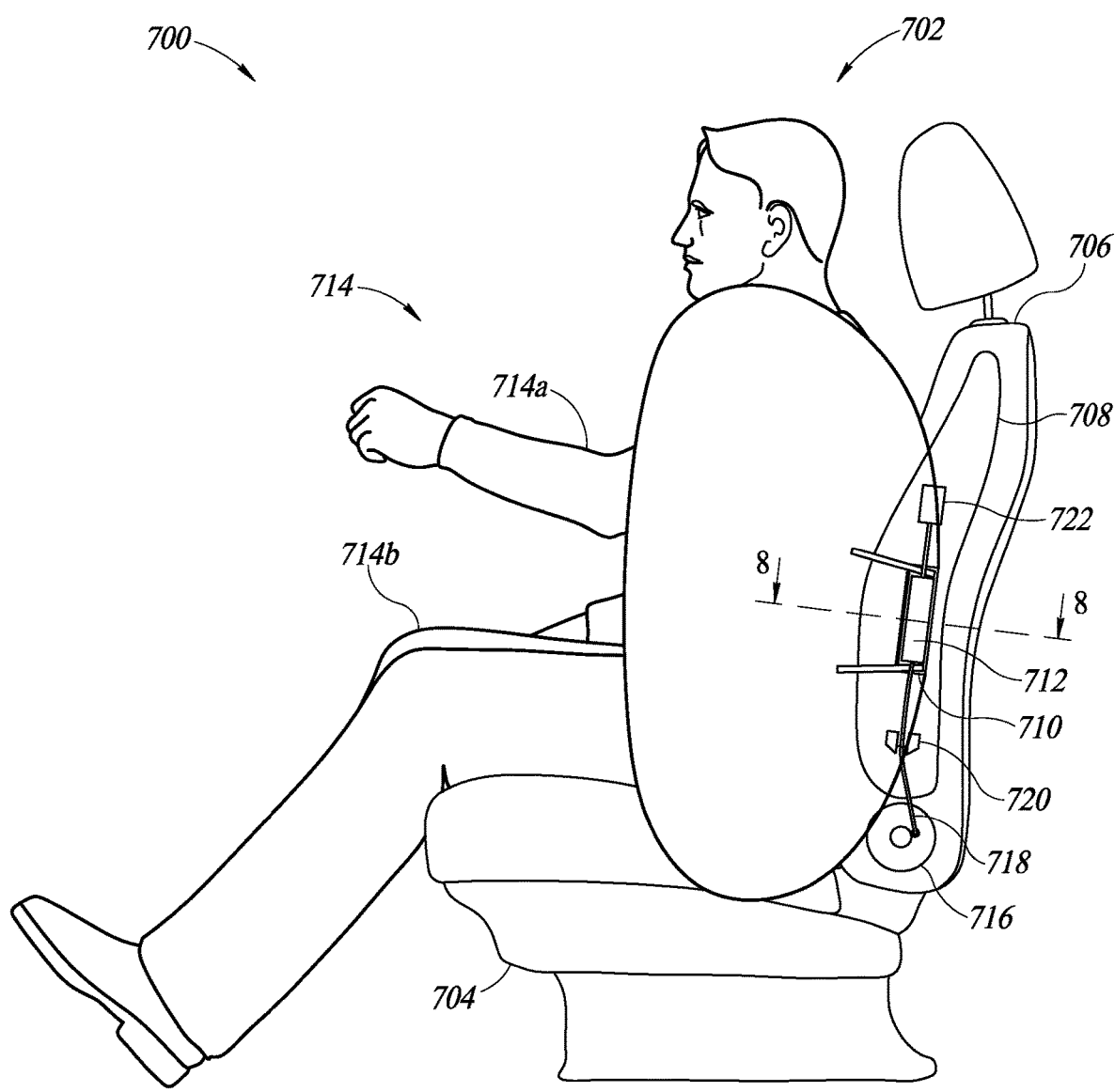
FIG. 7 illustrates another seat in an upright position of a system in accordance with an embodiment of the present disclosure.

FIG. 7 illustrates another seat 702 in an upright position of a system 700 in accordance with an embodiment of the present disclosure. Most parts of the seat 702 such as a seat base 704 and a seat frame 706 are similar to the seat base 108 and the back 110 of the seat 102. The seat frame 706 includes a recess 708 that forms a track. A rail 710 is positioned in the track of the seat frame 706 and is configured to slide along a length of the seat frame 706, when the seat frame 706 moves between the upright position and the reclined position.

The system 700 also includes an airbag inflator module 712 that includes components, such as an airbag (not shown) and an inflator (not shown). The airbag inflator module 712 is installed on the rail 710 in such a way that the airbag inflator module 712 slides along with the rail 710.

The system 700 also includes a pulley 716 and a cable 718 that has a similar construction as that of the pulley 128 and cable 130 of the assembly 100. As shown in FIG. 7, the cable 718 is coupled to the pulley 716 in such a way that the cable 718 winds and unwinds around the pulley 716 when the seat frame 706 moves between the upright position and reclined position. In addition, the cable 718 is fixedly coupled to the rail 710 in such a way that the winding and unwinding of the cable 718 causes the rail 710 to slide along the longitudinal length. The system 700 also includes a cable guide 720 that guides the cable 718 towards the pulley 716 when the cable 718 winds. In addition, the cable guide 720 guides the cable 718 towards the rail 710 when the cable 718 unwinds. The cable guide 720 includes an aperture that is sized and shaped to receive the cable 718. The system 700 also includes a pull piston 722 that has the same constructional features as that of the pull piston 134 (shown in FIG. 1) of the assembly 100.

Figure 8:
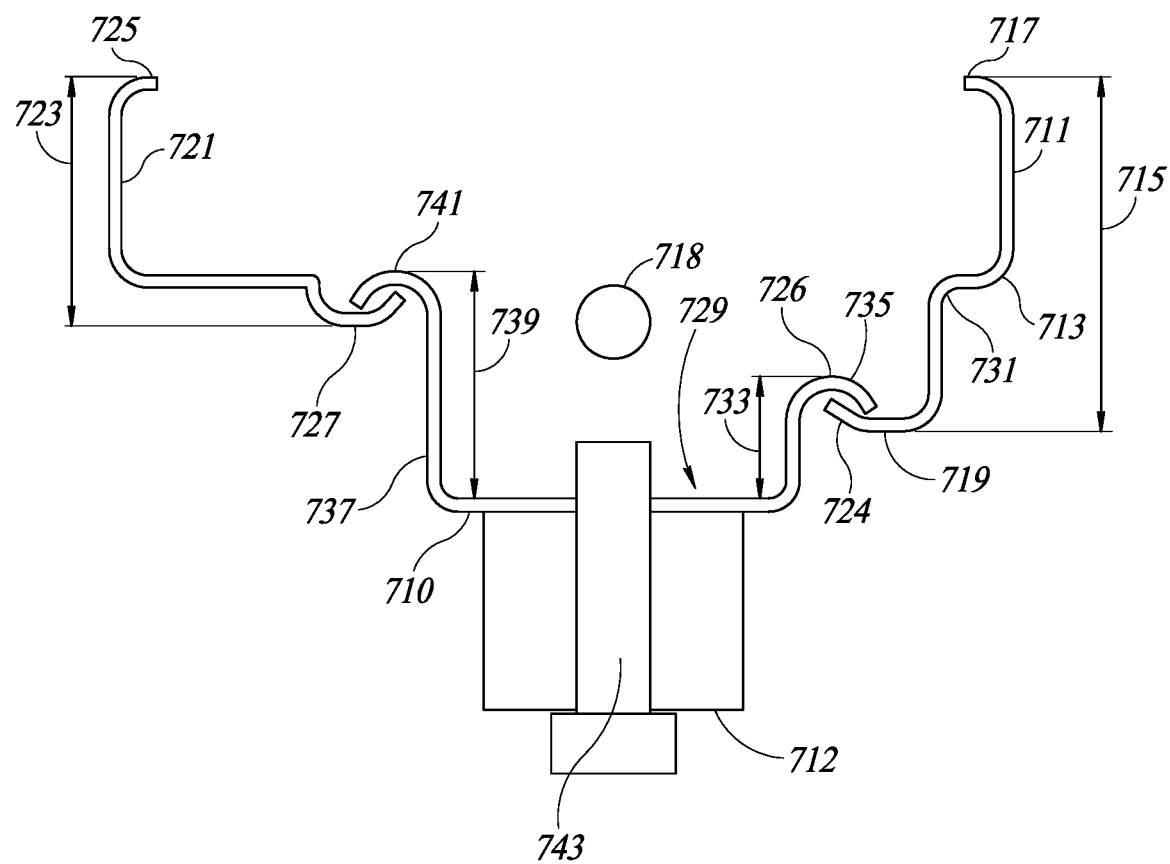
FIG. 8 is a partial cross-sectional view of the seat of FIG. 7, taken along line 8-8 in FIG. 7.

FIG. 8 is a partial cross-sectional view of the seat 702 of FIG. 7, taken along line 8-8 in FIG. 7. As shown, the seat frame 706 includes an integrated track 711 that has curved edges 724. The rail 710 also has curved edges 726 that overlaps with the curved edges 724, so that the rail 710 can slide with respect to the seat frame 706 while remaining coupled. The track 711 includes a first side 713 having a first dimension 715 from a first end 717 to a second end 719. The first side 713 includes a step 731 or tiered structure that accommodates design features of the seat. A second side 721 of the track 711 has a second dimension 723 between a first end 725 and a second end 727. The first dimension 715 is greater than the second dimension 723. The first side 713 may be closer to a back seat than the second side 721.

The rail 710 includes an interior surface 729. A first side 731 of the rail has a first dimension 733 from the surface 729 to an end 735 of one of the curved edges 726. A second side 737 has a second dimension 739 that extends from the surface 729 to an end 741. The second dimension 739 is greater than the first dimension 733. The fastener 743 passes through the rail 710 past the surface 729.

These and other changes can be made to the embodiments in light of the above-detailed description. In general, in the following claims, the terms used should not be construed to limit the claims to the specific embodiments disclosed in the specification and the claims but should be construed to include all possible embodiments along with the full scope of equivalents to which such claims are entitled. Accordingly, the claims are not limited by the disclosure.

The invention claimed is:

1. An apparatus, comprising:
   a seat moveable between an upright position and a reclined position;
   a track coupled to a side of the seat;
   an airbag inflator module; and
   a rail which coupleably receives the airbag inflator module, the rail coupled to the track to slideably move when the seat moves between the upright position and the reclined position.

2. The apparatus of claim 1, wherein the seat includes a frame having a side portion, the track positioned in the side portion of the frame.

3. The apparatus of claim 2, wherein the side portion of the frame includes a recess which is sized and shaped to receive the track.

4. The apparatus of claim 1, further comprising:
   a cable coupled to the rail, the cable extendable and retractable when the seat moves between the respective upright position and the reclined position; and a pulley, the cable winding around the pulley when the cable retracts, and unwinding around the pulley when the cable extends.

5. The apparatus of claim 4, wherein the cable is fixedly coupled to the rail such that the cable slideably moves the rail when the cable extends.

6. The apparatus of claim 1, further comprising:
   a pair of guides fixedly coupled to the rail, a first one of the pair of guides is positioned proximate to a first end of the airbag inflator module and a second one of the pair of guides is positioned proximate to a second end of the airbag inflator module.

7. The apparatus of claim 1, further comprising:
   a cable guide coupled to the track, the cable guide sized and shaped to guide a cable coupled to the rail.

8. A system, comprising:
   a seat frame that is moveable between an upright position and a reclined position;
   an airbag inflator module including an airbag; and
   a rail positioned on a side of the seat frame, the rail slideably moveable in response to movement of the seat frame between the upright and reclined positions.

9. The system of claim 8, further comprising:
   a pulley; and
   a cable that winds and unwinds around the pulley when the seat frame moves between the respective upright position and the reclined position.

10. The system of claim 9, further comprising:
    a cable guide having an aperture which is sized and shaped to receive the cable.

11. The system of claim 8, further comprising:
    a pull piston having a piston rod that is fixedly coupled to the rail.

12. The system of claim 11, wherein the pull piston is configured to slideably move the rail when the seat frame moves from the reclined position to the upright position.

13. The system of claim 8, further comprising:
    a first deployment guide positioned proximate to a first end of the airbag inflator module; and
    a second deployment guide positioned proximate to a second end of the airbag inflator module, the positioning of the first and second deployment guides guiding the airbag when the airbag is deployed.

14. The system of claim 8, wherein the rail is integrally formed with the seat frame.

15. A device, comprising:
    a seat frame;
    a moveable airbag system coupled to a side of the seat frame, the moveable airbag system including:
      a track coupled to the side of the seat frame;
      a rail coupled to the track;
      an airbag inflator module coupled to the rail;
      a cable coupled to the rail and to the side of the seat frame; and
      a pulley coupled to the cable.

16. The device of claim 15, wherein the track includes curved edges that curve inward from a centerline of the moveable airbag system and the rail includes curved edges that curve outward from the centerline of the moveable airbag system, the curved edges of the rail overlap with the curved edges of the track.

17. The device of claim 16, wherein the rail includes a centrally positioned platform coupled to the curved edges of the rail, the airbag inflator module being coupled to the platform.

18. The device of claim 17, wherein the rail includes a first wall coupled between a first one of the curved edges and a first side of the platform and a second wall coupled between a second one of the curved edges and a second side of the platform.

19. The device of claim 18, wherein the first wall has a dimension in a first direction that is greater than a dimension of the second wall in the first direction.

20. The device of claim 15, wherein the track includes a first cable guide and a second cable guide positioned at an end of the track that is closer to the pulley, the cable extending between the first and second cable guide.

* * * * *